United States Patent [19]

Dubs et al.

[11] Patent Number: 4,810,740

[45] Date of Patent: Mar. 7, 1989

[54] STABILIZED ORGANIC MATERIAL

[75] Inventors: Paul Dubs, Marly; Rita Pitteloud, Fribourg, both of Switzerland

[73] Assignee: Ciba-Geigy Corporation, Ardsley, N.Y.

[21] Appl. No.: 73,786

[22] Filed: Jul. 15, 1987

[30] Foreign Application Priority Data

Jul. 17, 1986 [CH] Switzerland ............... 2868/86

[51] Int. Cl.[4] .............................................. C08K 5/13
[52] U.S. Cl. ................................................ 524/333
[58] Field of Search ........................................ 524/333

[56] References Cited

U.S. PATENT DOCUMENTS

| 3,632,553 | 1/1972 | Summers et al. | 524/333 |
| 4,507,420 | 3/1985 | Rosenberger | 524/333 |
| 4,513,109 | 4/1985 | Rosenberger | 524/342 |

FOREIGN PATENT DOCUMENTS 0110830 11/1986 European Pat. Off. .

OTHER PUBLICATIONS

CA, 48, 640–641 (1954).
S. R. Finn et al., J. Soc. Chem. Ind. Supplementary Issue No. 1, 53 (1950).
R. Wegler et al., Makromol. Chem. 9, 1 (1952).
J. F. Walker, A.C.S. Monograph Series 159, 304 (1975).
Chemical Abstracts Registry File RN 57123-54-3 and RN 55977-96-3.

*Primary Examiner*—Veronica P. Hoke
*Attorney, Agent, or Firm*—Luther A. R. Hall

[57] ABSTRACT

Composition containing an organic material sensitive to oxidative, thermal and/or actinic degradation and a compound of the formula I

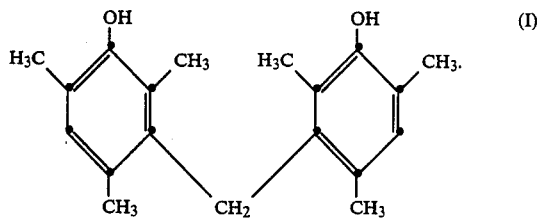

2 Claims, No Drawings

STABILIZED ORGANIC MATERIAL

The present invention relates to organic material which has been stabilized with bis[2,4,6-trimethyl-3-hydroxyphenyl]methane and to the use of this compound for stabilizing organic material against thermal, oxidative and/or actinic degradation.

The preparation of bis[2,4,6-trimethyl-3-hydroxyphenyl]methane was described as early as 1950 by S. R. Finn and J. W. G. Musty in "J. Soc. Chem. Ind. Supplementary Issue No. 1, S₃". U.S. Pat. Nos. 4,507,420 and 3,632,553 describe the use of bisphenols as stabilizers for organic material.

It has now been found that bis[2,4,6-trimethyl-3-hydroxyphenyl]methane is surprisingly particularly advantageous for use as a stabilizer for organic material.

The present invention accordingly provides a composition containing an organic material sensitive to oxidative, thermal and/or actinic degradation and the compound of the formula I

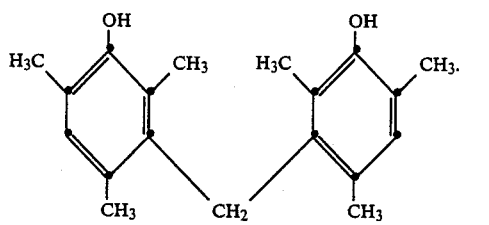

The organic material comprises for example:

1. polymers of mono- and diolefins, for example polypropylene, polyisobutylene, polybut-1-ene, polymethylpent-1-ene, polyisoprene or polybutadiene, and polymers of cycloolefins, e.g. of cyclopentene or norbornene; furthermore polyethylene (which can be cross-linked), e.g. high density polyethylene (HDPE), low density polyethylene (LDPE), linear low density polyethylene (LLDPE).

2. Mixtures of the polymers mentioned under (1), e.g. mixtures of polypropylene with polyisobutylene, polypropylene with polyethylene (for example PP/HDPE, PP/LDPE) and mixtures of various grades of polyethylene (e.g. LDPE/HDPE).

3. Copolymers of mono- and diolefins with one another or with other vinyl monomers, e.g. ethylene-propylene copolymers, linear low density polyethylene (LLDPE) and mixtures thereof with low density polyethylene (LDPE), propylene/but-1-ene copolymers, propylene-isobutylene copolymers, ethylene/but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene/alkyl acrylate copolymers, ethylene/alkyl methacrylate copolymers, ethylene/vinyl acetate copolymers or ethylene/acrylic acid copolymers and their salts (ionomers), as well as terpolymers of ethylene with propylene and a diene, such as hexadiene, dicyclopentadiene or ethylidenenorbornene; furthermore mixtures of such copolymers with one another and with polymers mentioned under (1), e.g. polypropylene/ethylene-propylene copolymers, LDPE/ethylene-vinyl acetate copolymers, LDPE/ethylene-acrylic acid copolymers, LLDPE/ethylene-vinyl acetate copolymers and LLDPE/ethylene-acrylic acid copolymers.

3a. Hydrocarbon resins (for example C₅–C₉) including hydrogenated modifications thereof (for example tackifier resins).

4. Polystyrene, poly-(p-methylstyrene), poly-(α-methylstyrene).

5. Copolymers of styrene or α-methylstyrene with dienes or acrylic derivatives, e.g. styrene-butadiene, styrene-acrylonitrile, styrene/alkyl methacrylate, styrene/butadiene/ alkyl acrylate, styrene/maleic anhydride, styrene/acrylonitrile/methyl acrylate; mixtures of high impact strength made of styrene copolymers and another polymer, for example a polyacrylate, a diene polymer or an ethylene-propylenediene terpolymer; and also block copolymers of styrene, e.g. styrene-butadiene-styrene, styrene-isoprene-styrene, styrene-ethylene/butylene-styrene or styrene-ethylene/propylene-styrene.

6. Graft copolymers of styrene or α-methylstyrene, e.g. styrene on polybutadiene, styrene on polybutadiene-styrene copolymers or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or alkyl methacrylates on polybutadiene, styrene and acrylonitrile on ethylene-propylenediene terpolymers, styrene and acrylonitrile on polyalkyl acrylates or polyalkyl methacrylates, styrene and acrylonitrile on acrylate-butadiene copolymers, and mixtures thereof with the copolymers mentioned under (5), of the type known, for example as ABS, MBS, ASA or AES polymers.

7. Halogen-containing polymers, e.g. polychloroprene, chlororubber, chlorinated or chlorosulfonated polyethylene, epichlorohydrin homopolymers and copolymers, in particular polymers of halogen-containing vinyl compounds, e.g. polyvinyl chloride, polyvinylidene chloride, polyvinyl fluoride, polyvinylidene fluoride; and their copolymers, such as vinyl chloride/vinylidene chloride, vinyl chloride/vinyl acetate or vinylidene chloride/vinyl acetate.

8. Polymers which are derived from α,β-unsaturated acids and derivatives thereof, such as polyacrylates and polymethacrylates, polyacrylamides and polyacrylonitriles.

9. Copolymers of the monomers mentioned under (8) with one another or with other unsaturated monomers, e.g. acrylonitrile-butadiene copolymers, acrylonitrile/alkyl acrylate copolymers, acrylonitrile/alkoxyalkyl acrylate copolymers, acrylonitrile/vinyl halide copolymers or acrylonitrile/alkyl methacrylate/butadiene terpolymers.

10. Polymers which are derived from unsaturated alcohols and amines or acyl derivatives or acetals thereof, such as polyvinyl alcohol, polyvinyl acetate, polyvinyl stearate, polyvinyl benzoate, polyvinyl maleate, polyvinyl butyral, polyallyl phthalate, polyallylmelamine; and their copolymers with olefins mentioned under Head 1.

11. Homo- and copolymers of cyclic ethers, such as polyalkylene glycols, polyethylene oxide, polypropylene oxide or copolymers thereof with bisglycidyl ethers.

12. Polyacetals, such as polyoxymethylene, and those polyoxymethylenes which contain comonomers, for example ethylene oxide; polyacetals which have been modified with thermoplastic polyurethanes, acrylates or MBS.

13. Polyphenylene oxides and sulfides and mixtures thereof with styrene polymers or polyamides.

14. Polyurethanes which are derived from polyethers, polyesters and polybutadienes having terminal hydroxyl groups on the one hand and aliphatic or aromatic polyisocyanates on the other, and precursors thereof.

15. Polyamides and copolyamides which are derived from diamines and dicarboxylic acids and/or aminocarboxylic acids or the corresponding lactams, such as nylon 4, nylon 6, nylon 6/6, 6/10, 6/9, 6/12, 4/6, nylon 11, nylon 12, aromatic polyamides based on m-xylene, diamine and adipic acid; polyamides prepared from hexamethylenediamine and isophthalic and/or terephthalic acid with or without an elastomer as modifier, e.g. poly-2,4,4-trimethylhexamethyleneterephthalamide, poly-m-phenyleneisophthalamide, block copolymers of the abovementioned polyamides with polyolefins, olefin copolymers, ionomers or chemically bonded or grafted elastomers; or with polyethers, e.g. with polyethylene glycol, polypropylene glycol or polytetramethylene glycol. Furthermore EPDM or ABS-modified polyamides or copolyamides; and polyamides condensed during processing ("RIM polyamide systems").

16. Polyureas, polyimides, polyamide imides and polybenzimidazoles.

17. Polyesters which are derived from dicarboxylic acids and dialcohols and/or from hydroxycarboxylic acids or the corresponding lactones, such as polyethylene terephthalate, polybutylene terephtualate, poly-1,4-dimethylolcyclohexane terephthalate, polyhydroxybenzoates, and block polyether esters which are derived from polyethers having hydroxyl end groups; furthermore polyesters modified with polycarbonates or with MBS.

18. Polycarbonates and polyester carbonates.

19. Polysulfones, polyether sulfones and polyether ketones.

20. Crosslinked polymers which are derived from aldehydes on the one hand and phenols, urea or melamine on the other, such as phenol-formaldehyde, urea-formaldehyde and melamine-formaldehyde resins.

21. Drying and non-drying alkyd resins.

22. Unsaturated polyester resins which are derived from copolyesters of saturated and unsaturated dicarboxylic acids with polyhydric alcohols, and also from vinyl compounds as crosslinking agents, as well as their halogen-containing, low-flammability modifications.

23. Crosslinkable acrylic resins which are derived from substituted acrylic acid esters, e.g. from epoxy acrylates, urethane-acrylates or polyester acrylates.

24. Alkyd resins, polyester resins and acrylate resins which have been crosslinked with melamine resins, urea resins, polyisocyanates or epoxy resins.

25. Crosslinked epoxy resins which are derived from polyepoxides, for example from bisglycidyl ethers or from cycloaliphatic diepoxides.

26. Natural polymers, such as cellulose, natural rubber or gelatin, and their polymerically homologous chemically modified derivatives, such as cellulose acetates, propionates and butyrates, and the cellulose ethers, such as methylcellulose, and also colophony resins and derivatives.

27. Mixtures (polyblends) of the abovementioned polymers, e.g. PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO.

28. Natural and synthetic organic substances which constitute pure monomeric compounds or mixtures thereof, for example mineral oils, animal or vegetable fats, oils and waxes, or oils, waxes and fats based on synthetic esters (e.g. phthalates, adipates, phosphates or trimellitates), and also blends of synthetic esters with mineral oils in any desired mixing ratios, as used for example in spin finishes, and aqueous emulsions thereof.

29. Aqueous emulsions of natural or synthetic rubbers, for example natural rubber latex or latexes of carboxylated styrene-butadiene copolymers.

Of interest are synthetic polymers, preferably elastomers, in particular the following materials:

(a) polydienes, for example polybutadiene, polyisoprene or polychloroprene; block polymers, for example styrene-butadiene-styrene, styrene-isoprene-styrene or acrylonitrile-butadiene copolymers.

(b) Copolymers of mono- and diolefins with one another or with other vinyl monomers, e.g. ethylene/alkyl acrylate copolymers, ethylene/alkyl methacrylate copolymers, ethylene/vinyl acetate copolymers and terpolymers of ethylene with propylene and a diene, such as hexadiene, dicyclopentadiene or ethylidenenorbornene.

(c) Halogen-containing polymers, e.g. polychloroprene, chlororubber, chlorinated or chlorosulfonated polyethylene, epichlorohydrin homopolymers and copolymers, chlorotrifluoroethylene copolymers, polymers of halogen-containing vinyl compounds, e.g. polyvinylidene chloride, or polyvinylidene fluoride; and copolymers thereof, such as vinyl chloride/vinylidene chloride, vinyl chloride/vinyl acetate or vinylidene chloride/vinyl acetate.

(d) Polyurethanes which are derived from polyethers, polyesters and polybutadiene having terminal hydroxyl groups on the one hand and aliphatic or aromatic polyisocyanates on the other, and precursors thereof.

(e) Natural rubber.

(f) Mixtures (polyblends) of the polymers listed under Heads (a) to (e).

(g) Aqueous emulsions of natural or synthetic rubbers, for example natural rubber latex or latexes of carboxylated styrene-butadiene copolymers.

Particular preference is given to polystyrene and co- and terpolymers of styrene, in particular carboxylated styrene-butadiene-rubber latex and also acrylonitrile-butadiene-styrene terpolymers (ABS).

Also of interest are polyolefins, preferably those mentioned under Head 1 above, in particular polyethylene and polypropylene, and copolymers thereof.

The compositions according to the invention contain advantageously 0.01 to 10%, preferably 0.05 to 5%, in particular 0.1 to 2%, of the compound of the formula I, based on the total weight of the organic material to be stabilized.

In addition to the compound of the formula I, the compositions according to the invention can also contain conventional additives, for example 1. Antioxidants 1.1 Alkylated monophenols, e.g. 2,6-di-tert.-butyl-4-methylphenol, 2-tert.-butyl-4,6-dimethylphenol, 2,6-di-tert.-butyl-4-ethylphenol, 2,6-di-tert.-butyl-4-n-butylphenol, 2,6-di-tert.-butyl-4-i-butylphenol, 2,6-di-cyclopentyl-4-methylphenol, 2-(α-methylcyclohexyl)-4,6-dimethylphenol, 2,6-di-octadecyl-4-methylphenol, 2,4,6-tri-cyclohexylphenol, 2,6-di-tert.-butyl-4-methoxymethylphenol, 2,6-di-nonyl-4-methylphenol.

1.2 Alkylated hydroquinones, e.g. 2,6-di-tert.-butyl-4-methoxyphenol, 2,5-di-tert.-butyl-hydroquinone, 2,5-di-tert.-amyl-hydroquinone, 2,6-diphenyl-4-octadecyloxyphenol.

1.3 Hydroxylated thiodiphenyl ethers, e.g. 2,2'-thio-bis-(6-tert.-butyl-4-methylphenol), 2,2'-thio-bis-(4-octylphenol), 4,4'-thio-bis-(6-tert.-butyl-3-methylphenol), 4,4'-thio-bis-( 6-tert.-butyl-2-methylphenol).

1.4. Alkylidene-bisphenols, e.g. 2,2'-methylene-bis-(6-tert.-butyl-4-methylphenol), 2,2'-methylene-bis-(6-tert.-butyl-4-ethylphenol), 2,2'-methylene-bis-[4-methyl-6-(α-methylcyclohexyl)-phenol], 2,2'-methylene-bis-(4-methyl-6-cyclohexylphenol), 2,2'-methylene-bis-(6-nonyl-4-methylphenol), 2,2'-methylene-bis-(4,6-di-tert.-butylphenol), 2,2'-ethylidene-bis-(4,6-di-tert.-butyl-phenol), 2,2'-ethylidene-bis-(6-tert.-butyl-4-isobutyl-phenol), 2,2'-methylene-bis-[6-(α-methylbenzyl)-4-nonylphenol], 2,2'-methylene-bis-[6-(α,α-di-methylbenzyl)-4-nonylphenol], 4,4'-methylene-bis-(2,6-di-tert.-butylphenol), 4,4'-methylene-bis-(6-tert.-butyl-2-methylphenol), 1,1-bis-(5-tert.-butyl-4-hydroxy-2-methylphenyl)-butane, 2,6-bis-(3-tert.-butyl-5-methyl-2-hydroxy-benzyl)-4-methylphenol, 1,1,3-tris-(5-tert.-butyl-4-hydroxy-2-methylphenyl)-butane, 1,1-bis-(5-tert.-butyl-4-hydroxy-2-methylphenyl)-3-n-dodecyl-mercaptobutane, ethylene glycol bis-[3,3-bis-(3'-tert.-butyl-4'-hydroxyphenyl)-butyrate], bis-(3-tert.-butyl-4-hydroxy-5-methylphenyl)-dicyclopentadiene, bis-[2-(3'-tert.-butyl-2'-hydroxy-5'-methyl-benzyl)-6-tert.-butyl-4-methyl-phenyl]terephthalate.

1.5. Benzyl compounds, e.g. 1,3,5-tris-(3,5-di-tert.-butyl-4-hydroxybenzyl)-2,4,6-trimethylbenzene, bis-(3,5-di-tert.-butyl-4-hydroxybenzyl) sulfide, isooctyl 3,5-di-tert.-butyl-4-hydroxybenzylmercapto acetate, bis-(4-tert.-butyl-3-hydroxy-2,6-dimethylbenzyl)dithiol terephthalate, 1,3,5-tris-(3,5-di-tert.-butyl-4-hydroxybenzyl) isocyanurate, 1,3,5-tris-(4-tert.-butyl-3-hydroxy-2,6-dimethylbenzyl) isocyanurate, dioctadecyl 3,5-di-tert.-butyl-4-hydroxybenzylphosphonate, Ca-salt of monoethyl 3,5-di-tert.-butyl-4-hydroxybenzylphosphonate, 1,3,5-tris-(3,5-dicyclohexyl-4-hydroxybenzyl) isocyanurate.

1.6. Acylaminophenols, e.g. 4-hydroxylauranilide, 4-hydroxystearanilide, 2,4-bis-(octylmercapto)-6-(3,5-di-tert.-butyl-4-hydroxyanilino)-s-triazine, octyl N-(3,5-di-tert.-butyl-4-hydroxyphenyl)-carbamate.

1.7. Esters of β-(3,5-di-tert.-butyl-4-hydroxyphenyl)-propionic acid with monohydric or polyhydric alcohols, for example with methanol, octadecanol, 1,6-hexanediol, neopentylglycol, thiodiethylene glycol, diethylene glycol, triethylene glycol, pentaerythritol, tris-(hydroxyethyl) isocyanurate, N,N'-bis-(hydroxyethyl)-oxamide.

1.8. Esters of β-(5-tert.-butyl-4-hydroxy-3-methylphenyl)-propionic acid with monohydric or polyhydric alcohols, for example with methanol, octadecanol, 1,6-hexanediol, neopentylglycol, thiodiethylene glycol, diethylene glycol, triethylene glycol, pentaerythritol, tris-(hydroxy)-ethyl isocyanurate, N,N'-bis-(hydroxyethyl)-oxamide.

1.9. Esters of β-(3,5-dicyclohexyl-4-hydroxyphenyl)-propionic acid with monohydric or polyhydric alcohols, for example with methanol, octadecanol, 1,6-hexanediol, neopentylglycol, thiodiethylene glycol, diethylene glycol, triethylene glycol, pentaery thritol, tris-(hydroxy)ethyl isocyanurate, N,N'-bis-(hydroxyethyl)-oxamide.

1.10 Amides of β-(3,5-di-tert.-butyl-4-hydroxyphenyl)-propionic acid, e.g. N,N'-bis-(3,5-di-tert.-butyl-4-hydroxy-phenylpropionyl)-nexamethylenediamine, N,N'-biS-(3,5-di-tert.-butyl-4-hydroxyphenylpropionyl)-trimethylenediamine, N,N'-bis-(3,5-di-tert.-butyl-4-hydroxyphenylpropionyl)-hydrazine.

2. UV absorbers and light stabilizers 2.1. 2-(2'-Hydroxyphenyl)-benzotriazoles, for example the 5'-methyl, 3',5'-di-tert.-butyl, 5'-tert.-butyl, 5'-(1,1,3,3-tetramethylbutyl), 5-chloro-3',5'-di-tert.-butyl, 5-chloro-3'-tert.-butyl-5'-methyl, 3'-sec.-butyl-5'-tert.-butyl, 4-octoxy, 3',5'-di-tert.-amyl, 3',5'-bis-(α,α-dimethylbenzyl) derivative.

2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy, 2'-hydroxy-4,4'-dimethoxy derivative.

2.3. Esters of substituted or unsubstituted benzoic acids, e.g. 4-tert.-butyl phenyl salicylate, phenyl salicylate, octylphenyl salicylate, dibenzoylresorcinol, bis-(4-tert.-butylbenzoyl)-resorcinol, benzoylresorcinol, 2,4-di-tert.-butylphenyl 3,5-di-tert.-butyl-4-hydroxybenzoate, hexadecyl 3,5-di-tert.-butyl-4-hydroxybenzoate.

2.4. Acrylates, e.g. ethyl or isooctyl α-cyano-β,β-diphenylacrylate, methyl α-carbomethoxycinnamate, methyl or butyl α-cyano-β-methyl-p-methoxycinnamate, methyl α-carbomethoxy-p-methoxycinnamate, N-(β-carbomethoxy-β-cyanovinyl)-2-methylindoline.

2.5. Nickel compounds, for example nickel complexes of 2,2'-thio-bis-[4-(1,1,3,3-tetramethylbutyl)-phenol], such as the 1:1 or the 1:2 complex, with or without additional ligands, such as n-butylamine, triethanolamine or N-cyclohexyldiethanolamine, nickel dibutyldithiocarbamate, nickel salts of monoalkyl esters of 4-hydroxy-3,5-di-tert.-butylbenzylphosphonic acid, for example of a methyl or ethyl ester, nickel complexes of ketoximes, for example of 2-hydroxy-4-methylphenylundecylketone oxime, nickel complexes of 1-phenyl-4-lauroyl-5-hydroxypyrazole, with or without additional ligands.

2.6. Sterically hindered amines, e.g. bis-(2,2,6,6-tetramethylpiperidyl) sebacate, bis-(1,2,2,6,6-pentamethyl-piperidyl) sebacate, bis-(1,2,2,6,6-pentamethylpiperidyl) n-butyl-3,5-di-tert.-butyl-4-hydroxybenzylmalonate, condensation product of 1-hydroxyethyl-2,2,6,6-tetramethyl-4-hydroxypiperidine and succinic acid, condensation product of N,N'-bis-(2,2,6,6-tetramethyl-4-piperidyl)-hexamethylenediamine and 4-tert.-octylamino-2,6-dichloro-1,3,5-5-triazine, tris-(2,2,6,6-tetramethyl-4-piperidyl) nitrilotriacetate, tetrakis-(2,2,6,6-tetramethyl-4-piperidyl) 1,2,3,4-butanetetraoate, 1,1'-(1,2-ethanediyl)-bis-(3,3,5,5-tetramethylpiperazinone).

2.7. Oxamides, e.g. 4,4'-di-octyloxyoxanilide, 2,2'-di-octyloxy-5,5'-di-tert.-butyloxanilide, 2,2'-di-dodecyloxy-5,5'-di-tert.-butyloxanilide, 2-ethoxy-2'-ethyloxanilide, N,N'-bis-(3-dimethylaminopropyl)-oxamide, 2-ethoxy-5-tert.-butyl-2'-ethyloxanilide and its mixture with 2-ethoxy-2'-ethyl-5,4'-di-tert.-butyloxanilide, mixtures of o- and p-methoxy- and of o- and p-ethoxy-disubstituted oxanilides.

3. Metaldeactivators, e.g. N,N'-diphenyloxamide, N-salicylal-N'-salicyloylhydrazine, N,N'-bis-(salicyloyl)-hydrazine, N,N'-bis-(3,5-di-tert.-butyl-4- hydroxyphenylpropionyl)-hydrazine, 3-salicyloylamino-1,2,4-triazole, bis-(benzylidene)-oxalodihydrazide.

4. Phosphites and phosphonites, e.g. triphenyl phosphite, diphenyl alkyl phosphites, phenyl dialkyl phosphites, tris-(nonylphenyl) phosphite, trilauryl phosphite, trioctadecyl phosphite, distearyl pentaerythritol diphosphite, tris(2,4-di-tert.-butylphenyl) phosphite, diisodecyl pentaerythritol diphosphite, bis-(2,4-di-tert.-butylphenyl)-pentaerythritol diphosphite, tristearyl sorbitol triphosphite, tetrakis-(2,4-di-tert.-butylphenyl)-4,4'-biphenylene diphosphonite, 3,9-bis-(2,4-di-tert.-butylphenoxy)-2,4,8,10-tetraoxa-3,9-diphosphaspiro[5.5]undecane.

5. Peroxide-destroying compounds, for example esters of β-thiodipropionic acid, e.g. the lauryl, stearyl, myristyl or tridecyl ester, mercaptobenzimidazole, the zinc salt of 2-mercaptobenzimidazole, zinc dibutyldithiocarbamate, dioctadecyl disulfide, pentaerythritol tetrakis-(β-dodecylmercapto)-propionate.

6. Stabilizers for polyamide, for example copper salts in combination with iodides and/or phosphorus compounds and salts of divalent manganese.

7. Basic costabilizers, e.g. melamine, polyvinylpyrrolidone, dicyanodiamide, triallyl cyanurate, urea derivatives, hydrazine derivatives, amines, polyamides, polyurethanes, alkali metal and alkaline earth metal salts of higher fatty acids, for example Ca-stearate, Zn-stearate, Mg-stearate, Na-ricinoleate, K-palmitate, antimony pyrocatecholate or tin pyrocatecholate.

8. Nucleating agents, e.g. 4-tert.-butylbenzoic acid, adipic acid, diphenylacetic acid.

9. Fillers and reinforcing agents, e.g. calcium carbonate, silicates, glass fibres, asbestos, talc, kaolin, mica, barium sulfate, metal oxides and hydroxides, carbon black, graphite.

10. Other additives, for example plasticizers, lubricants, emulsifiers, pigments, fluorescent brightening agents, flameproofing agents, antistats, blowing agents.

The incorporation of the compound of the formula I and of any further additives used into the organic material is effected by known methods, for example before or during shaping or even by applying the dissolved or dispersed compounds to the organic material, if appropriate with subsequent evaporation of the solvent. The compound of the formula I can also be added to the materials to be stabilized in the form of a masterbatch which contains said compound for example in a concentration of 2.5 to 25% by weight.

The compound of the formula I can also be added before or during the polymerization or before the cross-linking.

The materials thus stabilized can be employed in a very wide variety of forms, for example as films, fibres, ribbons, moulding compositions, profiles or as binders for paints, adhesives or putties.

The compound of the formula I is known and can be prepared in the manner of known processes, for example as described in the abovementioned article by S. R. Finn and J. W. G. Musty.

The preparation of the compound of the formula I is advantageously effected by reacting mesitol with formaldehyde in the presence of catalyst at a temperature of 0° to 100° C., preferably 0° to 60° C., and in an organic solvent, for example in a chlorohydrocarbon, e.g. methylene chloride, chloroform or dichloroethane, or in an ether, e.g. tetrahydrofuran, dimethoxyethane or dioxane, or in toluene or in an alcohol, e.g. ethanol or isopropanol, or in a glycol or glycol monoalkyl ether, or even in water. The reaction can if appropriate be carried out in a nitrogen atmosphere. Suitable catalysts are for example: organic and inorganic, solid or liquid strong acids, e.g. sulfuric acid, phosphoric acid, polyphosphoric acid, hydrochloric acid, p-toluenesulfonic acid or acid ion exchangers, for example ®Nafion H. The catalyst can if appropriate also be present in an aqueous solution.

The molar ratio mesitol/aldehyde is advantageously 2:1 to 2:2.5, and the molar ratio mesitol/catalyst 1:0.5 to 1:3. The reaction time can be for example 2 to 20 hours.

It is advantageous to remove the acid (catalyst) after the reaction by washing with a suitable base or with water.

If the product precipitates from the reaction mixture, it is advantageously filtered off and used directly; otherwise, after the solvent has been removed, the product can be worked up by conventional methods (for example recrystallization or chromatography).

Possible variants of the preparative process described above are, for example:

1. Mesitol, formaldehyde, catalyst and solvent can be mixed at 0° C. and subsequently be stirred at a temperature of 0° to 100° C., preferably 0° to 60° C., until reaction has taken place.

2. Mesitol and formaldehyde can be presented in an organic solvent, and the catalyst can be added at a temperature of 0° to 100° C., preferably 0° to 60° C. .

3. Mesitol and catalyst can be presented in a solvent, and a formaldehyde solution can be added at 0° to 100° C., preferably 0° to 60° C.

A further possible process for preparing the compound of the formula I is to react mesitol with a compound of the formula II

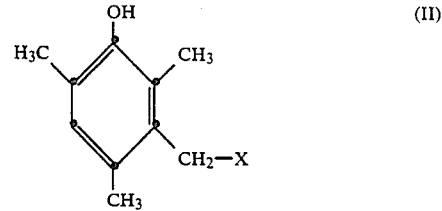

in which X is for example halogen, tosyl, mesyl, hydroxyl, alkoxy or acyloxy, in the presence of a catalyst and in an organic solvent. The reaction can take place at a temperature of, for example, 50° C. The catalyst used can advantageously be a Brönsted or Lewis acid, e.g. zinc chloride. Examples of suitable solvents are the same as recited in the preceding process of preparation. The reaction time can be for example 5 hours.

The example which follows illustrates the preparation of compound of the formula I:

EXAMPLE 1

Preparation of bis[2,4,6-trimethyl-3-hydroxyphenyl]methane

In a nitrogen atmosphere a mixture of 100 g of mesitol, 30 ml of 38% formalin and 360 ml of methylene chloride is introduced first. 35 ml of 85% sulfuric acid are added dropwise at 0° C. After the addition has ended, the mixture is stirred under reflux for 15 hours. The reaction mixture is then cooled down and neutralized with 25% aqueous ammonia solution. The solvent is then distilled off. The residue is heated with 180 ml of methanol under reflux for 30 minutes and then filtered hot. On cooling down the filtrate, the product precipitates out.

The melting point is 188–189° C.

Elemental analysis Calculated: C 80.1%; H 8.52% Found: C 80.12%; H 8.49%

The examples which follow illustrate the invention in more detail. All the perentages are by weight, unless otherwise stated.

EXAMPLE 2

Stabilization of acrylonitrile/butadiene/styrene terpolymers.

1000 parts of unstabilized ABS powder (polybutadiene content ~25%) are thoroughly mixed with 100 parts of cyclohexane which contain 2.5 parts of bis[2,4,6-trimethyl-3-hydroxyphenyl]methane as stabilizer. The solvent is removed in vacuo at 40° C. /N$_2$.

The dried mixture is subsequently treated in a dry mixer with 20 parts of titanium dioxide (rutile) and 10 parts of lubricant (ethylenebistearamide). The powder stabilized in this way is processed on a two-roll mill into a sheet. Conditions: Front roll: 175° C./16 revolutions per minute Back roll: 180° C./17 revolutions per minute.

The sheet is pressed at 180° C. in a laboratory press in the course of 5 minutes into a plate of 1 mm thickness.

Sections of 20×50 mm$^2$ are punched out of the plate for use as test specimens.

The test specimens are exposed for 24 hours in an exposure instrument (Xenotest 450 with a black panel temperature of (45±1)° C.) and then subjected to oven ageing at 80° C. for 400 hours. The effectiveness of stabilization is measured in terms of the yellowness index defined in ASTM D 1925-70. The results are given in Table 1. An unstabilized sample would yellow so strongly under the above-stated test conditions right at the start of the test that a statement of the yellowness index in accordance with ASTM D 1925-70 would no longer be possible.

TABLE 1

|  | Yellowness Index |
|---|---|
| Initial state | 14.3 |
| After 24 hours' exposure | 7 |
| After 400 hours' oven ageing at 80° C. | 24 |

EXAMPLE 3

Stabilization of carboxylated styrene/butadiene/rubber latex

A concentrated solution in methanol is prepared of bis[2,4,6-trimethyl-3-hydroxyphenyl]methane and stirred into a carboxylated styrene/butadiene/rubber latex. 5 g of latex are then introduced into a Petri dish having a diameter of 6 cm and dried at 80° C. in a drying cabinet. After drying, 0.1 part of the abovementioned compound is present in 100 parts of styrene/butadiene/rubber. The result obtained is a transparent film having a thickness of about 0.2 mm. This film is suspended in a hot through-circulation oven at 135° C. The stabilization of the sample is measured in terms of the yellowness index defined in ASTM D 1925-70, which is determined at regular intervals. The results are given in Table 2.

TABLE 2

| Stabilizer | Yellowness Index after exposure time in hours | | | |
|---|---|---|---|---|
|  | 0 | 24 | 72 | 135 |
| None | 3 | 96 | — | — |
| Bis[2,4,6-trimethyl-3-hydroxyphenyl]methane | 3 | 15 | 36 | 89 |

What is claimed is:

1. A composition containing an acrylonitrile-butadiene-styrene terpolymer sensitive to oxidative, thermal and/or actinic degradation and a stabilizing amount of the compound of formula I

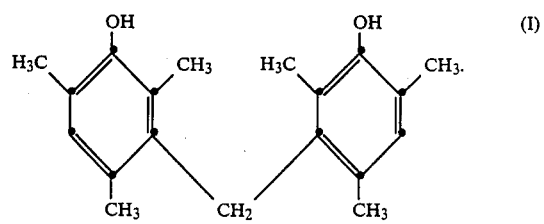

2. A process for stabilizing acrylonitrile-butadiene-styrene terpolymer sensitive to thermal, oxidative and/or actinic degradation, which comprises incorporating into the organic material a stabilizing amount of the compound of the formula I

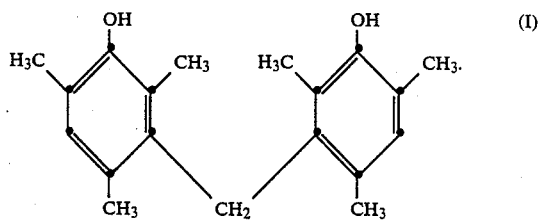

* * * * *